US012463310B2

(12) United States Patent
Wang et al.

(10) Patent No.: US 12,463,310 B2
(45) Date of Patent: Nov. 4, 2025

(54) PHASE SHIFTING DEVICE WITH SLIDABLE PLATE FOR SIGNAL TRANSMISSION PATH LENGTH ADJUSTMENT, USABLE IN AN ANTENNA UNIT OR BASE STATION

(71) Applicant: Telefonaktiebolaget LM Ericsson (publ), Stockholm (SE)

(72) Inventors: Yuesong Wang, Beijing (CN); Zhiming Tian, Beijing (CN); Rui Ma, Beijing (CN); Xinfeng Zhang, Beijing (CN); Jianlan Li, Beijing (CN)

( * ) Notice: Subject to any disclaimer, the term of this patent is extended or adjusted under 35 U.S.C. 154(b) by 99 days.

(21) Appl. No.: 18/548,146

(22) PCT Filed: Sep. 14, 2021

(86) PCT No.: PCT/CN2021/118273
§ 371 (c)(1),
(2) Date: Aug. 28, 2023

(87) PCT Pub. No.: WO2022/227371
PCT Pub. Date: Nov. 3, 2022

(65) Prior Publication Data

US 2024/0145892 A1 May 2, 2024

(30) Foreign Application Priority Data

Apr. 30, 2021 (WO) ................ PCT/CN2021/091606

(51) Int. Cl.
*H01P 1/18* (2006.01)
*H01P 5/02* (2006.01)
(Continued)

(52) U.S. Cl.
CPC .............. *H01P 1/184* (2013.01); *H01P 5/028* (2013.01); *H01Q 3/32* (2013.01); *H01Q 21/0075* (2013.01); *H01Q 1/246* (2013.01)

(58) Field of Classification Search
CPC ...................................................... H01P 1/184
(Continued)

(56) References Cited

U.S. PATENT DOCUMENTS 6,208,222 B1 3/2001 Sinsky
2005/0174195 A1 8/2005 Heiniger et al.
(Continued)

FOREIGN PATENT DOCUMENTS

CN 111342174 A 6/2020
CN 111952698 A 11/2020
(Continued)

*Primary Examiner* — Benny T Lee
(74) *Attorney, Agent, or Firm* — Murphy, Bilak & Homiller, PLLC

(57) ABSTRACT

A phase shifting device, an antenna unit and abase station are disclosed. According to an embodiment, the phase shifting device comprises a power divider and a phase shifter. The power divider comprises an input inlet for an input signal, a first output outlet connected with an impedance member having a system impedance, and a second output outlet connected with the phase shifter. The phase shifter comprises a first plate and a second plate slidable relative to the first plate. Two parallel microstrip lines are provided on a first surface of the first plate. An adjusting member is provided on a second surface of the second plate that faces to the first surface of the first plate. The adjusting member is configured to adjust a length of a total signal transmission path that is from one to the other of the two parallel microstrip lines via an intermediate signal transmission path introduced by the adjusting member, or to prohibit the input signal from transmitting to the second output outlet, according to a position of the second plate relative to the first plate when the second plate slides relative to the first plate.

20 Claims, 11 Drawing Sheets

(51) Int. Cl.
*H01Q 3/32* (2006.01)
*H01Q 21/00* (2006.01)
*H01Q 1/24* (2006.01)

(58) Field of Classification Search
USPC .......................................................... 333/161
See application file for complete search history.

(56) References Cited

U.S. PATENT DOCUMENTS

| | | | | |
|---|---|---|---|---|
| 2010/0219907 | A1* | 9/2010 | Kim et al. | H01P 1/184 333/161 |
| 2015/0028968 | A1 | 1/2015 | Katipally et al. | |
| 2018/0337438 | A1* | 11/2018 | So et al. | H01P 1/184 |

FOREIGN PATENT DOCUMENTS

| | | | |
|---|---|---|---|
| CN | 112271420 | A | 1/2021 |
| CN | 112436249 | A | 3/2021 |
| GB | 2439761 | A | 1/2008 |

* cited by examiner

PHASE SHIFTING DEVICE WITH SLIDABLE PLATE FOR SIGNAL TRANSMISSION PATH LENGTH ADJUSTMENT, USABLE IN AN ANTENNA UNIT OR BASE STATION

CROSS REFERENCE TO RELATED APPLICATION(S)

The present application claims the priority of PCT Application No. PCT/CN2021/091606, filed on Apr. 30, 2021, the disclosure of which is hereby entirely incorporated by reference.

TECHNICAL FIELD

Embodiments of the disclosure generally relate to electronic devices, and, more particularly, to a phase shifting device, an antenna unit and a base station.

BACKGROUND

This section introduces aspects that may facilitate better understanding of the present disclosure. Accordingly, the statements of this section are to be read in this light and are not to be understood as admissions about what is in the prior art or what is not in the prior art.

Base station is an important part of a mobile communication system, and may include a radio unit and an antenna unit. Phase shifter is widely used in antenna units which include remote electrical tilt (RET), because a phase shift can realize beam scan function. Generally, there are two types of phase shifter based on principle: one via changing a signal propagation path length, and the other via changing a dielectric constant of a part of the signal propagation path, which can affect signal propagation velocity.

Currently, for both path length changing phase shifter and dielectric constant changing phase shifter, the phase shifting function needs to be realized by a sliding part. For path length changing phase shifter solution, the output impedance changes as the sliding part changes the phase, which affects the power obtained in the signal propagation path, causing a change in power distribution. For dielectric constant changing phase shifter solution, more extra space is needed for sliding a medium block, which needs to follow the signal propagation path. In this case, the dielectric constant changing phase shifter solution makes design more complex and limited by the signal propagation path.

SUMMARY OF THE INVENTION

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide an improved phase shifting device. In particular, one of the problems to be solved by the disclosure is that the phase shifter in the existing antenna unit could not be flexibly controlled.

According to a first aspect of the disclosure, there is provided a phase shifting device. The phase shifting device may comprise a power divider and a phase shifter. The power divider may comprise an input inlet for an input signal, a first output outlet connected with an impedance member having a system impedance, and a second output outlet connected with the phase shifter. The phase shifter may comprise a first plate and a second plate slidable relative to the first plate. Two parallel microstrip lines may be provided on a first surface of the first plate. An adjusting member may be provided on a second surface of the second plate that faces to the first surface of the first plate. The adjusting member may be configured to adjust a length of a total signal transmission path that is from one to the other of the two parallel microstrip lines via an intermediate signal transmission path introduced by the adjusting member, or to prohibit the input signal from transmitting to the second output outlet, according to a position of the second plate relative to the first plate when the second plate slides relative to the first plate.

In this way, it is possible to flexibly switch the phase shifter on and off in the phase shifting device.

In an embodiment of the disclosure, the power divider may be a T-shaped power divider.

In an embodiment of the disclosure, the power divider may be provided on the first surface of the first plate, and the second output outlet may be connected with one of the two parallel microstrip lines.

In an embodiment of the disclosure, the system impedance may be 50 ohms.

In an embodiment of the disclosure, when the second plate slides relative to the first plate so that the adjusting member can adjust the length of the total signal transmission path, the adjusting member may introduce an infinite impedance at two coupling points on the two parallel microstrip lines where the intermediate signal transmission path is coupled to the two parallel microstrip lines.

In an embodiment of the disclosure, the adjusting member may introduce an infinite impedance at two first points on the second plate, and a distance between each of the two coupling points and a corresponding first point may be an integral multiple of half-wavelength.

In an embodiment of the disclosure, the adjusting member may comprise a first part on one side of the second surface of the second plate and a separate second part on the other side of the second surface of the second plate. The first part may define the intermediate signal transmission path and have two points that correspond to the two coupling points on the two parallel microstrip lines of the first plate. The second part may include two parallel microstrip lines each of which has a first end adjacent to the first part and an opposite second end having the first points.

In an embodiment of the disclosure, the two parallel microstrip lines of the second plate may have the same spacing as that of the two parallel microstrip lines of the first plate.

In an embodiment of the disclosure, during the sliding of the second plate relative to the first plate, the first end may be coupled to a corresponding one of the two parallel microstrip lines of the first plate, and the second end does not overlap with the two parallel microstrip lines of the first plate or at most overlaps with a corresponding one of the two parallel microstrip lines of the first plate only at a limit position of the sliding of the second plate.

In an embodiment of the disclosure, the adjusting member may introduce an infinitely small impedance at a second point on each of the two parallel microstrip lines of the first plate, and a distance between each of the two coupling points and a corresponding second point may be an odd multiple of a quarter-wavelength.

In an embodiment of the disclosure, the adjusting member may comprise a first part on one side of the second surface of the second plate and a separate second part on the other side of the second surface of the second plate. The first part may define the intermediate signal transmission path and have two points that correspond to the two coupling points on the two parallel microstrip lines of the first plate. The second part may include a conductive body which couples the two parallel microstrip lines of the first plate to the ground.

In an embodiment of the disclosure, the ground may be provided on the first plate beside the two parallel microstrip lines.

In an embodiment of the disclosure, during the sliding of the second plate relative to the first plate, the conductive body may be coupled to the ground and the two parallel microstrip lines of the first plate.

In an embodiment of the disclosure, the conductive body may be a sheet or a bar made of metal.

In an embodiment of the disclosure, the metal may be copper.

In an embodiment of the disclosure, the first part may be a microstrip line having a shape of U, H, V, W or M.

In an embodiment of the disclosure, when the second plate slides relative to the first plate so that the first part overlaps with the impedance member connected with the first output outlet, the adjusting member can prohibit the input signal from transmitting to the second output outlet.

In an embodiment of the disclosure, a layer of insulating film may be provided on the second surface of the second plate and cover the adjusting member.

According to a second aspect of the disclosure, there is provided an antenna unit comprising a phase shifting device according to the above first aspect.

According to a third aspect of the disclosure, there is provided a base station comprising a phase shifting device according to the above first aspect.

BRIEF DESCRIPTION OF THE DRAWINGS

These and other objects, features and advantages of the disclosure will become apparent from the following detailed description of illustrative embodiments thereof, which are to be read in connection with the accompanying drawings. Apparently, the schematic structure diagrams in the following drawings are not necessarily drawn to scale, but exhibit various features in a simplified form. Furthermore, the drawings in the following description relate merely to some embodiments of the disclosure, but should not be construed as limiting the disclosure.

DETAILED DESCRIPTION OF THE INVENTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

Figure 1:
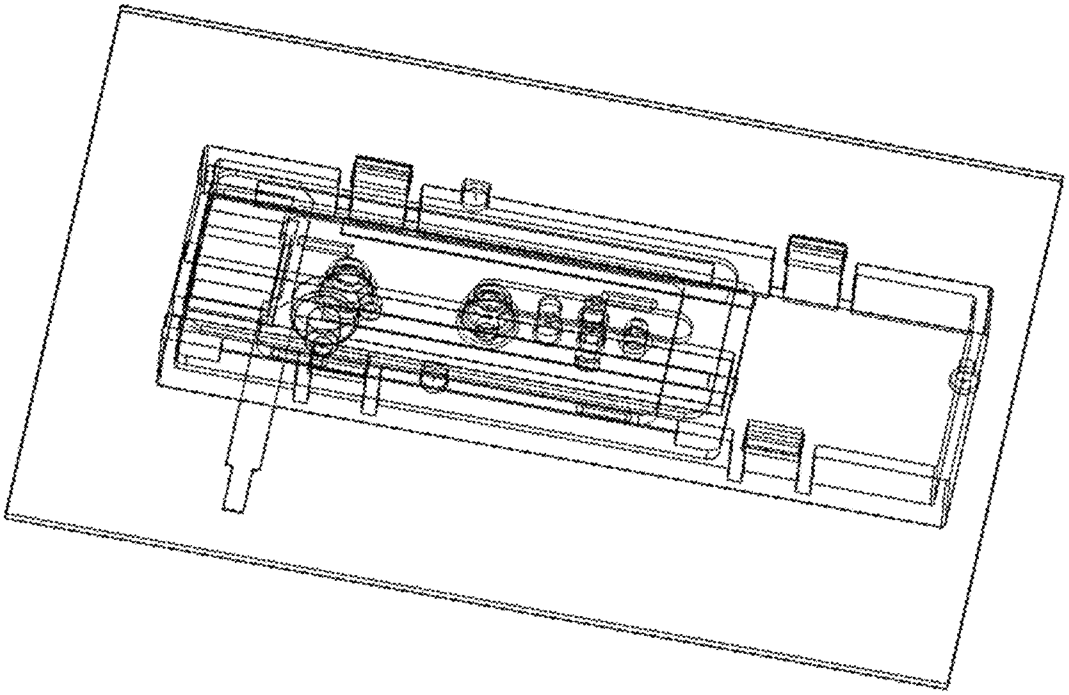
FIG. 1 is a diagram illustrating a phase shifting device according to a first embodiment of the disclosure.
Figure 2:
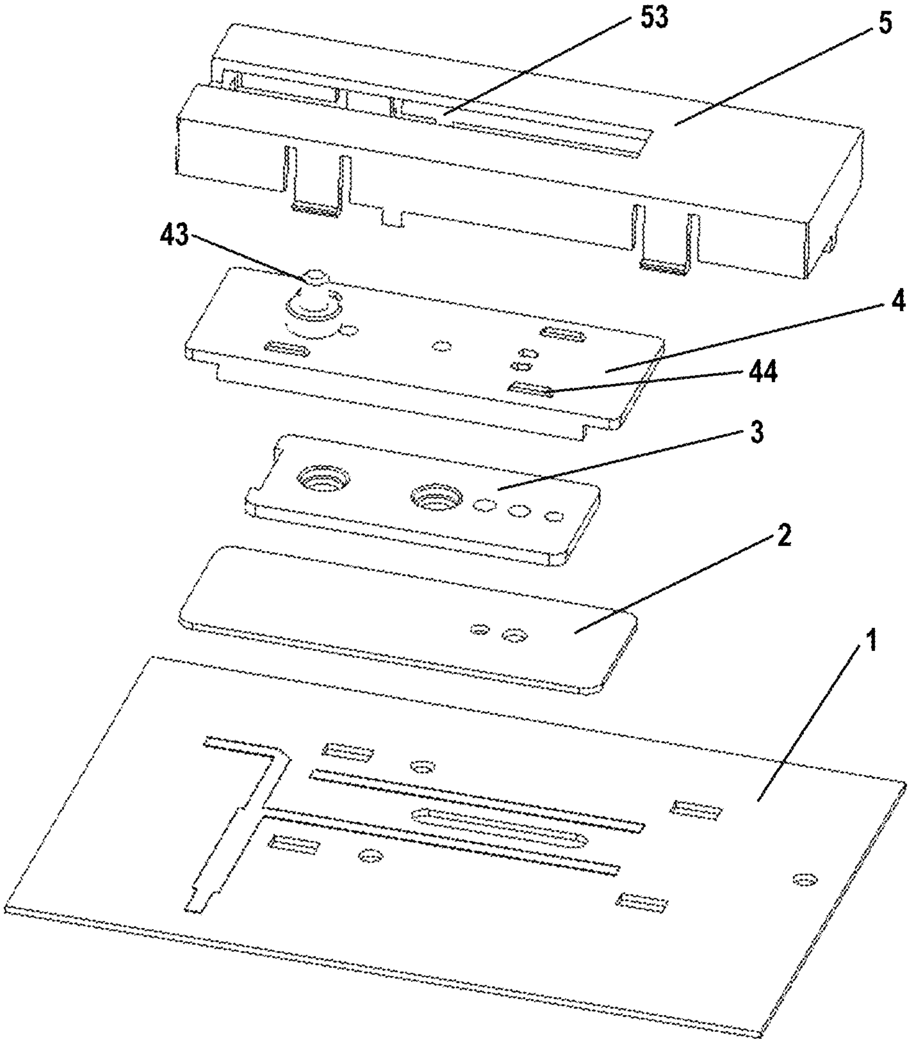
FIG. 2 is an exploded diagram of the phase shifting device according to the first embodiment viewed from a top side.
Figure 3:
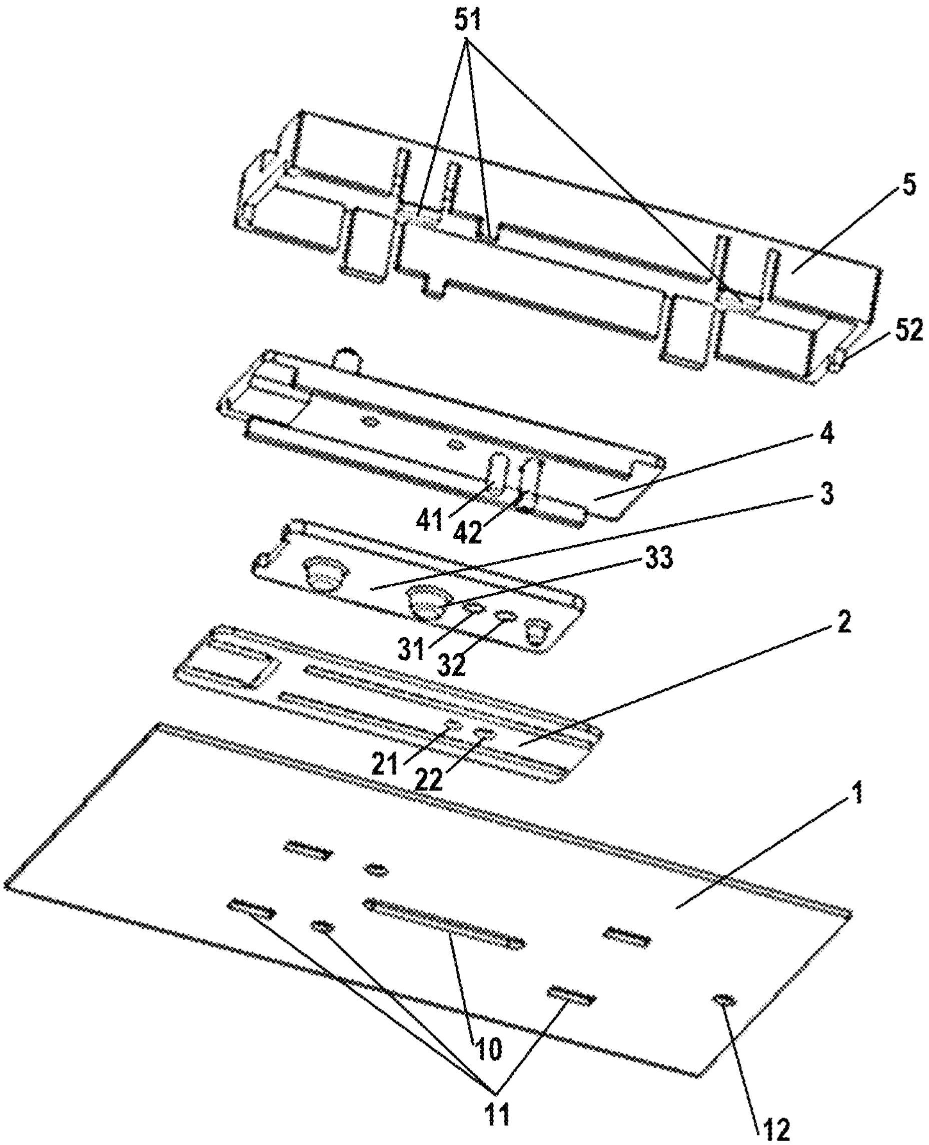
FIG. 3 is an exploded diagram of the phase shifting device according to the first embodiment viewed from a bottom side.

Firstly, a phase shifting device according to a first embodiment of the disclosure will be described with reference to FIGS. 1-7. FIG. 1 is a diagram illustrating the phase shifting device according to the first embodiment. FIG. 2 is an exploded diagram of the phase shifting device according to the first embodiment viewed from a top side. FIG. 3 is an exploded diagram of the phase shifting device according to the first embodiment viewed from a bottom side. As shown in FIGS. 1-3, the phase shifting device according to the first embodiment comprises a fixed plate ("first plate") 1, a sliding plate ("second plate") 2, a spacer plate 3, a drive plate 4, and a cover 5.

The fixed plate 1 may be mounted on a stationary member, such as an antenna reflector plate. The sliding plate 2, the spacer plate 3 and the drive plate 4 are fastened together, so as to form an assembly which is slidable relative to the fixed plate 1. The cover 5 is fixed to the fixed plate 1 and defines a space for housing the assembly formed by the sliding plate 2, the spacer plate 3 and the drive plate 4. In the illustrated embodiment, two pins 41, 42 protrude from a bottom surface of the drive plate 4, extend through corresponding holes 31, 32 formed in the spacer plate 3 and corresponding holes 21, 22 formed in the sliding plate 2, and are inserted into a guiding groove 10 formed in a central portion of the fixed plate 1. Further, at tip ends of side walls of the cover 5, there is provided a plurality of lugs 51, 52, which can be inserted into corresponding holes 11, 12 formed in the fixed plate 1. It should be noted that the way of fastening the sliding plate 2, the spacer plate 3 and the drive plate 4 together or fixing the cover 5 to the fixed plate 1 is not limited to what is illustrated.

Each of the fixed plate 1, the sliding plate 2, the spacer plate 3, the drive plate 4 and the cover 5 may be made of plastic, for example. As can be seen from FIG. 3, the spacer plate 3 is provided with three elastic parts 33, which may be made of rubber, for example. As can be seen from FIG. 2, the drive plate 4 is provided with a drive portion 43 on its top surface. For example, the drive portion 43 may be connected to an output shaft of a step motor. A groove 53 is formed at a top plate of the cover 5, and the drive portion 43 can slide in the groove 53. On the top surface of the drive plate 4, four protrusions 44 are provided, which can reduce friction between the drive plate 4 and the top plate of the cover 5.

Figure 4:
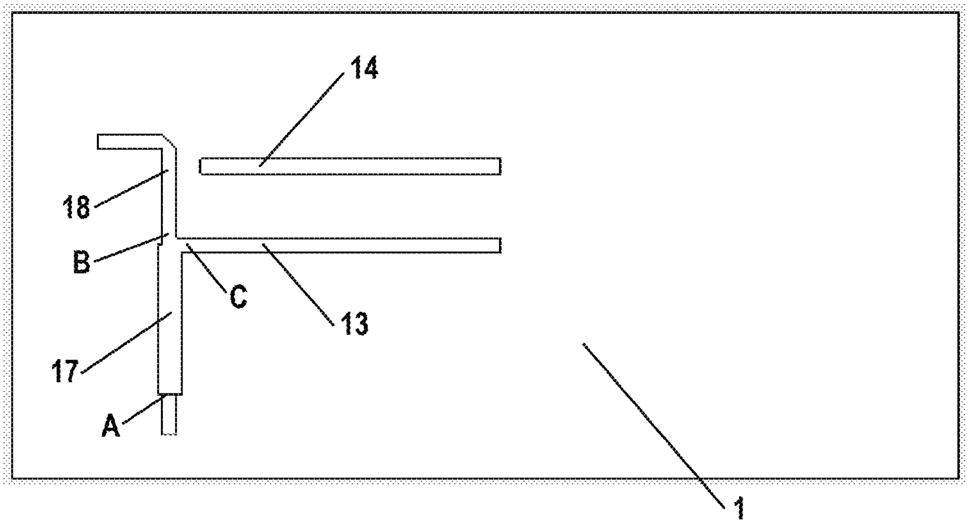
FIG. 4 is a top view of a fixed plate of the phase shifting device according to the first embodiment.
Figure 5:
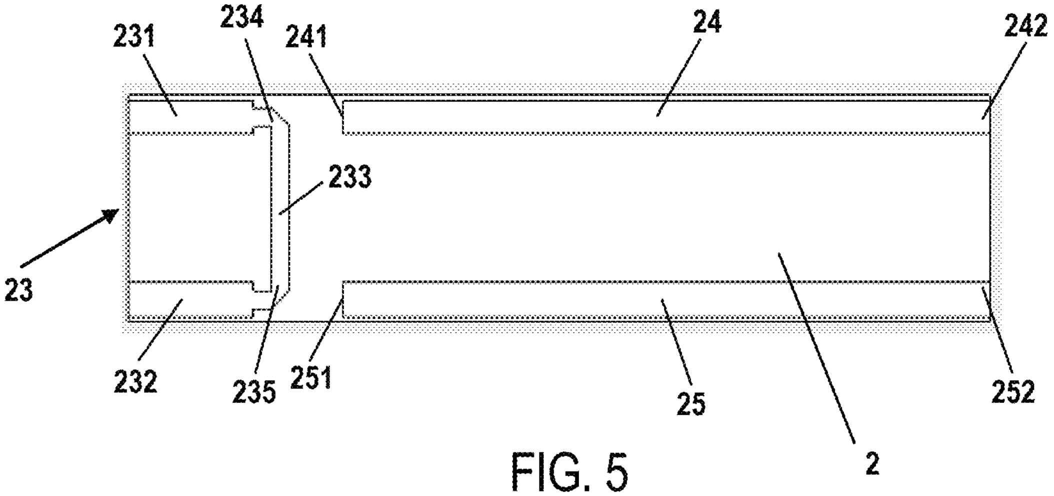
FIG. 5 is a bottom view of a sliding plate of the phase shifting device according to the first embodiment.
Figure 6:
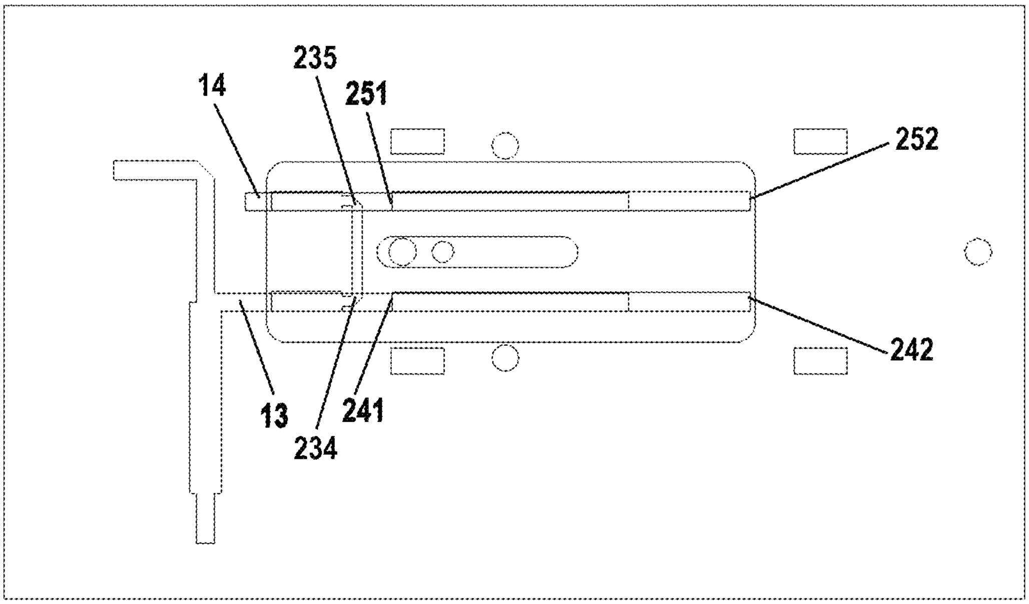
FIG. 6 is a diagram illustrating an assembly of the fixed plate and the sliding plate of the phase shifting device according to the first embodiment in switching-on state.
Figure 7:
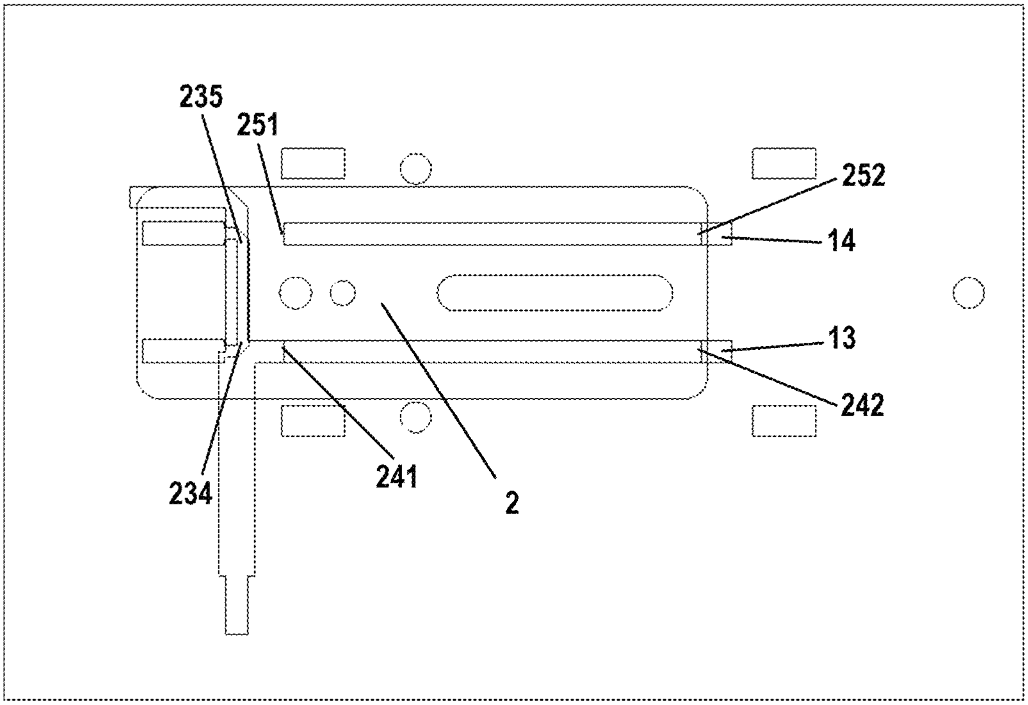
FIG. 7 is a diagram illustrating an assembly of the fixed plate and the sliding plate of the phase shifting device according to the first embodiment in switching-off state.

Now, the fixed plate 1 and the sliding plate 2 will be described in detail with reference to FIGS. 4-7. FIG. 4 illustrates a top view of the fixed plate 1. FIG. 5 illustrates a bottom view of the sliding plate 2. Note that for the purpose of clarity, the guiding groove 10 and the holes 11, 12 formed in the fixed plate 1 are omitted in FIG. 4 and the holes 21, 22 formed in the sliding plate 2 are omitted in FIG. 5. FIG. 6 illustrates an assembly of the fixed plate 1 and the sliding plate 2 in switching-on state. FIG. 7 illustrates an assembly of the fixed plate 1 and the sliding plate 2 in switching-off state.

As shown in FIG. 4, a power divider 17 made of a T-shaped microstrip line and two parallel microstrip lines 13, 14 are provided on a top surface ("first surface") of the fixed plate 1. The power divider 17 has an input inlet A for an input signal, a first output outlet B connected with an impedance member 18 made of a microstrip line having a system impedance (e.g. 50 ohms), and a second output outlet C connected with the microstrip line 13. Although not shown in FIG. 4, the guiding groove 10 is located between the two parallel microstrip lines 13, 14 as shown in FIG. 2.

As shown in FIG. 5, a U-shaped microstrip line ("first part") 23 is provided on the left end ("one side") of a bottom surface ("second surface") of the sliding plate 2, and two parallel microstrip lines ("second part") 24, 25 are provided on the right end ("the other side") of the bottom surface of the sliding plate 2. The U-shaped microstrip line 23 has two legs 231, 232 and a connecting bar 233. The U-shaped microstrip line 23 and the two parallel microstrip lines 24, 25 form an adjusting member which together with the two parallel microstrip lines 13, 14 can constitute a phase shifter. When the sliding plate 2 slides relative to the fixed plate 1, depending on the position of the sliding plate 2 relative to the fixed plate 1, the phase shifter can operate normally as shown in FIG. 6 (which may be called switching-on state) to adjust the phase of the branch corresponding to the output outlet C, or be switched off as shown in FIG. 7 (which may be called switching-off state) so that the energy of the input signal is no longer transmitted to the branch corresponding to the output outlet C.

As shown in FIG. 6, in the switching-on state, the adjusting member is electrically coupled to the two parallel microstrip lines 13, 14 of the fixed plate 1 when the fixed plate 1 and the sliding plate 2 are assembled together. The spacing between the two legs 231, 232 of the U-shaped microstrip line 23 is the same as the spacing between the two parallel microstrip lines 13, 14 of the fixed plate 1. Also, the two parallel microstrip lines 24, 25 of the sliding plate 2 have the same spacing as that of the two parallel microstrip lines 13, 14 of the fixed plate 1. The two legs 231, 232 of the U-shaped microstrip line 23 and the two parallel microstrip lines 24, 25 of the sliding plate 2 overlap the two parallel microstrip lines 13, 14 of the fixed plate 1. Accordingly, the U-shaped microstrip line 23 defines an intermediate signal transmission path which couples the two parallel microstrip lines 13, 14 of the fixed plate 1. The intermediate signal transmission path is coupled to the two parallel microstrip lines 13, 14 of the fixed plate 1 at two points, i.e., a first coupling point 234 between a first leg 231 and the connecting bar 233, and a second coupling point 235 between a second leg 232 and the connecting bar 233. The location of the two coupling points 234, 235 is fixed with respect to the sliding plate 2, but the location of two corresponding coupling points on the two parallel microstrip lines 13, 14 of the fixed plate 1 varies as the sliding plate 2 slides relative to the fixed plate 1.

Each of the two parallel microstrip lines 24, 25 of the sliding plate 2 has a first end 241, 251 adjacent to the U-shaped microstrip line 23, and an opposite second end 242, 252 ("first point"). A distance between each of the two coupling points 234, 235 of the U-shaped microstrip line 23 and the second end 242, 252 of a corresponding one of the two parallel microstrip lines 24, 25 of the sliding plate 2 is a half-wavelength of the target frequency. The location of the second ends 242, 252 of the two parallel microstrip lines 24, 25 is fixed with respect to the sliding plate 2, but the location of corresponding two points on the two parallel microstrip lines 13, 14 of the fixed plate 1 varies as the sliding plate 2 slides relative to the fixed plate 1.

In the switching-on state, an infinite impedance is introduced at a point on each of the two parallel microstrip lines 13, 14 of the fixed plate 1 that corresponds to the second end 242, 252 of a corresponding one of the two parallel microstrip lines 24, 25 of the sliding plate 2. Thus, the second ends 242, 252 of the two parallel microstrip lines 24, 25 are in open circuit state. Further, an infinite impedance is also introduced at the two coupling points on the two parallel microstrip lines 13, 14 of the fixed plate 1 that correspond to the two coupling points 234, 235 of the U-shaped microstrip line 23. Accordingly, when the phase shifter operates normally, the energy of the input signal flows in from one microstrip line 13 on the fixed plate 1, through the U-shaped microstrip line 23 on the sliding plate 2, and then flows out from the other microstrip line 14. When the sliding plate 2 slides relative to the fixed plate 1, the length of the total signal transmission path through which the energy flows changes so that the phase changes accordingly. Compared with existing phase shifter solutions, the phase shifter in the phase shifting device according to this embodiment does not need to introduce an extra length of transmission line. Accordingly, the transmission of signal on the transmission line will not be affected during the whole travel of the sliding plate for phase shifting, the insertion loss is reduced, and the insertion phase is shorter.

A distance between each of the two coupling points 234, 235 of the U-shaped microstrip line 23 and the first end 241, 251 of a corresponding one of the two parallel microstrip lines 24, 25 of the sliding plate 2, or in other words, a length of each of the two parallel microstrip lines 24, 25 of the sliding plate 2, can be set depending on the range of adjustment. The two parallel microstrip lines 24, 25 of the sliding plate 2 are arranged such that during a travel (or sliding) of the sliding plate 2, the first end 241, 251 is (always) coupled to a corresponding one of the two parallel microstrip lines 13, 14 of the fixed plate 1, and the second end 242, 252 does not overlap with the two parallel microstrip lines 13, 14 of the fixed plate 1 or at most overlaps with a corresponding one of the two parallel microstrip lines 13, 14 of the fixed plate 1 only at a limit position of the travel of the sliding plate 2 where the second end 242, 252 is directly above the right end point of a corresponding one of the two parallel microstrip lines 13, 14.

Although not shown, a layer of insulating film is provided on the bottom surface of the sliding plate 2 and covers the U-shaped microstrip line 23 and the two parallel microstrip lines 24, 25 of the sliding plate 2. The insulating film prevents direct contact of the U-shaped microstrip line 23 and the two parallel microstrip lines 24, 25 of the sliding plate 2 with the two parallel microstrip lines 13, 14 of the fixed plate 1, but still allows electrical coupling between the U-shaped microstrip line 23 or the two parallel microstrip lines 24, 25 of the sliding plate 2 and the two parallel microstrip lines 13, 14 of the fixed plate 1. As a result, the third-order intermodulation distortion is suppressed.

As shown in FIG. 7, in the switching-off state, the U-shaped microstrip line 23 on the sliding plate 2 slides to coincide with the microstrip line 18 connected with the output outlet B of the T-shaped power divider 17. Since the distance between each of the two coupling points 234, 235 of the U-shaped microstrip line 23 and the second end 242, 252 of a corresponding one of the two parallel microstrip lines 24, 25 of the sliding plate 2 is a half-wavelength of the target frequency, the microstrip lines 24, 25 on the sliding plate 2 and the microstrip lines 13, 14 on the fixed plate 1 are in open circuit state so that the energy of the input signal is no longer transmitted to the branch corresponding to the output outlet C. In this case, part of the input signal travels through the microstrip line 18 and part of the input signal travels through the U-shaped microstrip line 23.

As an exemplary example, the combined structure formed by the U-shaped microstrip line 23 and the microstrip line 18 which are overlapped with each other may have an impedance and an electrical length which are approximately equal to the impedance and the electrical length of the microstrip line 17 respectively, so that the total electrical length of the combined structure and the microstrip line 17 is a half-wavelength of the target frequency and thus does not affect the impedance of the overall phase shifting device. As a result, the impedance of the transmission path can be adjusted and the energy loss in the transmission process can be reduced. Further, each of the microstrip lines 13, 14 may have an impedance equal to the system impedance (e.g. 50 ohms) so that the impedance of the branch corresponding to the output outlet C remains the system impedance when the phase shifter is in the switching-on state.

It should be noted that the present disclosure is not limited to the above example. As another example, any other suitable mechanism that enables the sliding plate 2 to slide relative to the fixed plate 1 may be used. As still another example, any other suitable power divider besides the T-shaped divider may be used. As still another example, a distance between each of the two coupling points 234, 235 of the U-shaped microstrip line 23 and the second end 242, 252 of a corresponding one of the two parallel microstrip lines 24, 25 of the sliding plate 2 is not limited to a half-wavelength of the target frequency, but may be any integral multiple of the half-wavelength. As still another example, the first part of the adjusting member may be a microstrip line having any other suitable shape such as H, V, W or M. As still another example, the U-shaped microstrip line 23 may be opened toward the right side, i.e., toward the two parallel microstrip lines 24, 25 of the sliding plate 2, or may be replaced with a V-shaped microstrip line opened toward either the left side or the right side. Alternatively, a bar-shaped microstrip line may also be employed. In this regard, it would suffice as long as the microstrip line provides an intermediate signal transmission path having two points electrically coupled to the two parallel microstrip lines 13, 14 of the fixed plate 1, and a distance between each of the two points and the second end 242, 252 of a corresponding one of the two parallel microstrip lines 24, 25 of the second plate 2 is an integral multiple of half-wavelength.

Figure 8:
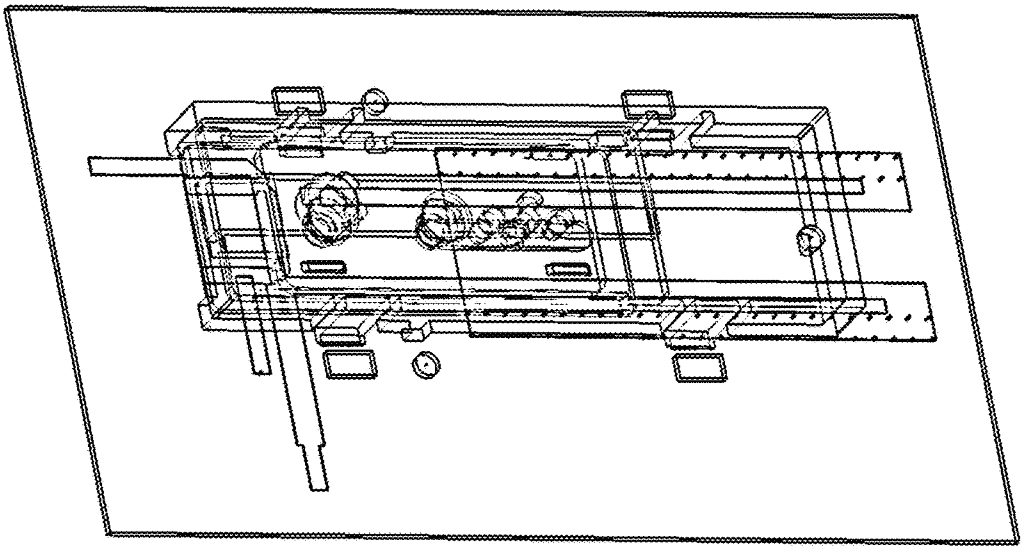
FIG. 8 is a diagram illustrating a phase shifting device according to a second embodiment of the disclosure.
Figure 9:
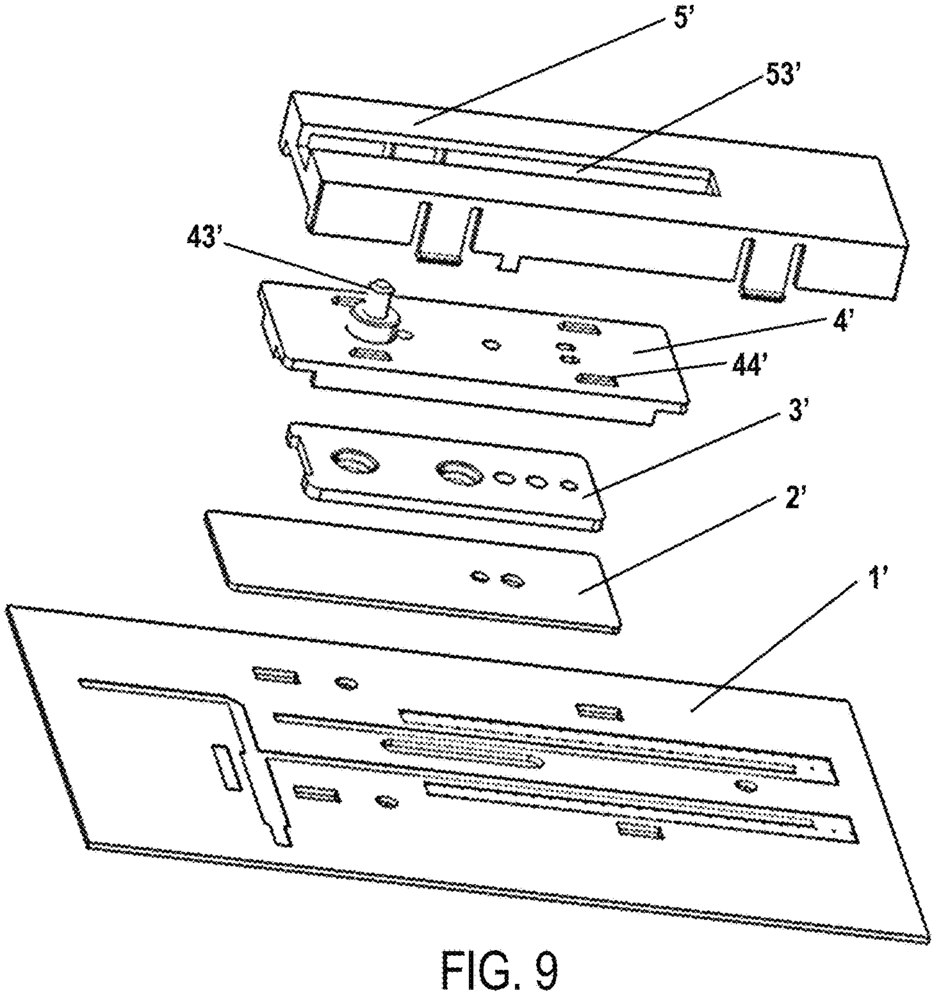
FIG. 9 is an exploded diagram of the phase shifting device according to the second embodiment viewed from a top side.
Figure 10:
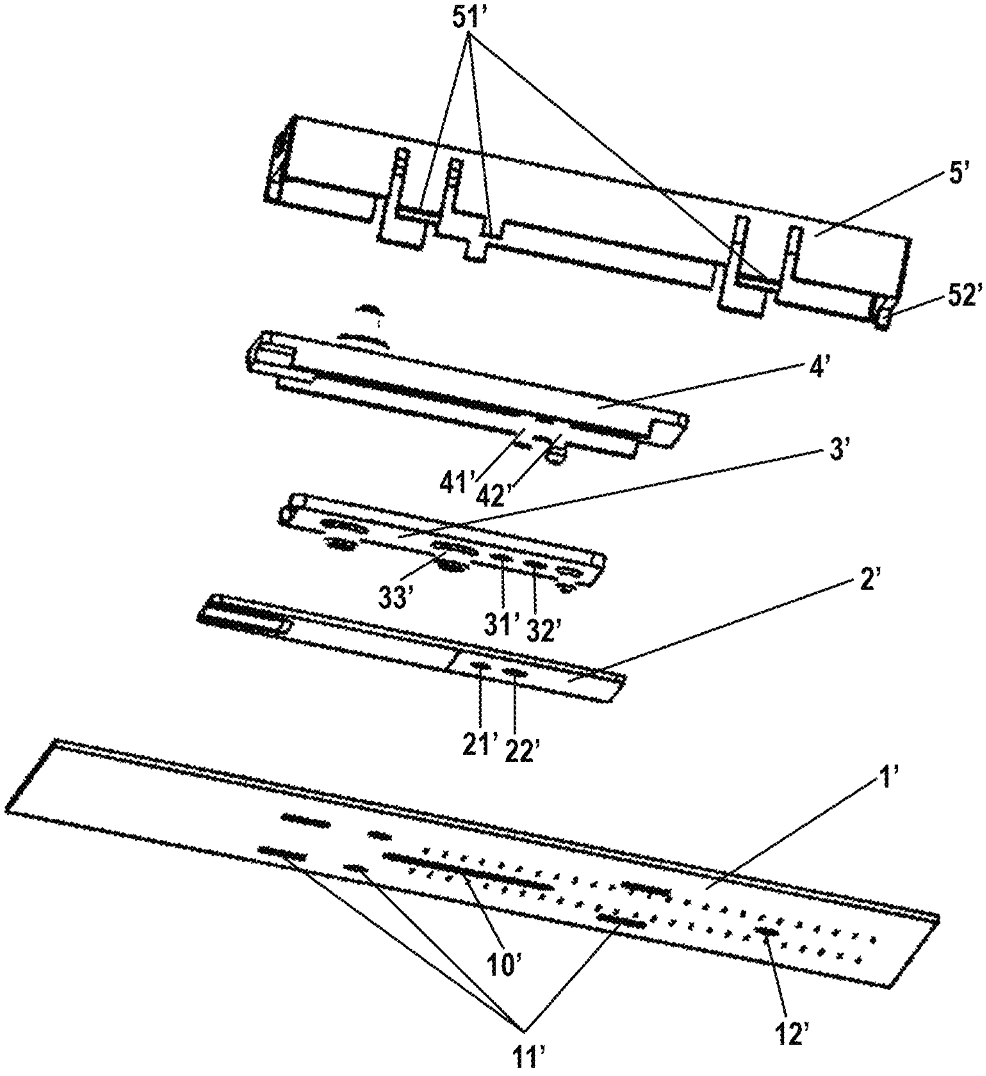
FIG. 10 is an exploded diagram of the phase shifting device according to the second embodiment viewed from a bottom side.

Now, a phase shifting device according to a second embodiment of the disclosure will be described with reference to FIGS. 8-14. FIG. 8 is a diagram illustrating the phase shifting device according to the second embodiment. FIG. 9 is an exploded diagram of the phase shifting device according to the second embodiment viewed from a top side. FIG. 10 is an exploded diagram of the phase shifting device according to the second embodiment viewed from a bottom side. As shown in FIGS. 8-10, the phase shifting device according to the second embodiment comprises a fixed plate ("first plate") 1', a sliding plate ("second plate") 2', a spacer plate 3', a drive plate 4', and a cover 5'.

The fixed plate 1' may be mounted on a stationary member, such as an antenna reflector plate. The sliding plate 2', the spacer plate 3' and the drive plate 4' are fastened together, so as to form an assembly which is slidable relative to the fixed plate 1'. The cover 5' is fixed to the fixed plate 1' and defines a space for housing the assembly formed by the sliding plate 2', the spacer plate 3' and the drive plate 4'. In the illustrated embodiment, two pins 41', 42' protrude from a bottom surface of the drive plate 4', extend through corresponding holes 31', 32' formed in the spacer plate 3' and corresponding holes 21', 22' formed in the sliding plate 2', and are inserted into a guiding groove 10' formed in a central portion of the fixed plate 1'. Further, at tip ends of side walls of the cover 5', there is provided a plurality of lugs 51', 52', which can be inserted into corresponding holes 11', 12' formed in the fixed plate 1'. It should be noted that the way of fastening the sliding plate 2', the spacer plate 3' and the drive plate 4' together or fixing the cover 5' to the fixed plate 1' is not limited to what is illustrated.

Each of the fixed plate 1', the sliding plate 2', the spacer plate 3', the drive plate 4' and the cover 5' may be made of plastic, for example. As can be seen from FIG. 9, the drive plate 4' is provided with a drive portion 43' on the top surface of the drive plate 4'. For example, the drive portion 43' may be connected to an output shaft of a step motor. A groove 53' is formed at a top plate of the cover 5', and the drive portion 43' can slide in the groove 53'. On the top surface of the drive plate 4', four protrusions 44' are provided, which can reduce friction between the drive plate 4' and the top plate of the cover 5'. As can be seen from FIG. 10, the spacer plate 3' is provided with three elastic parts 33', which may be made of rubber, for example.

Figure 11:
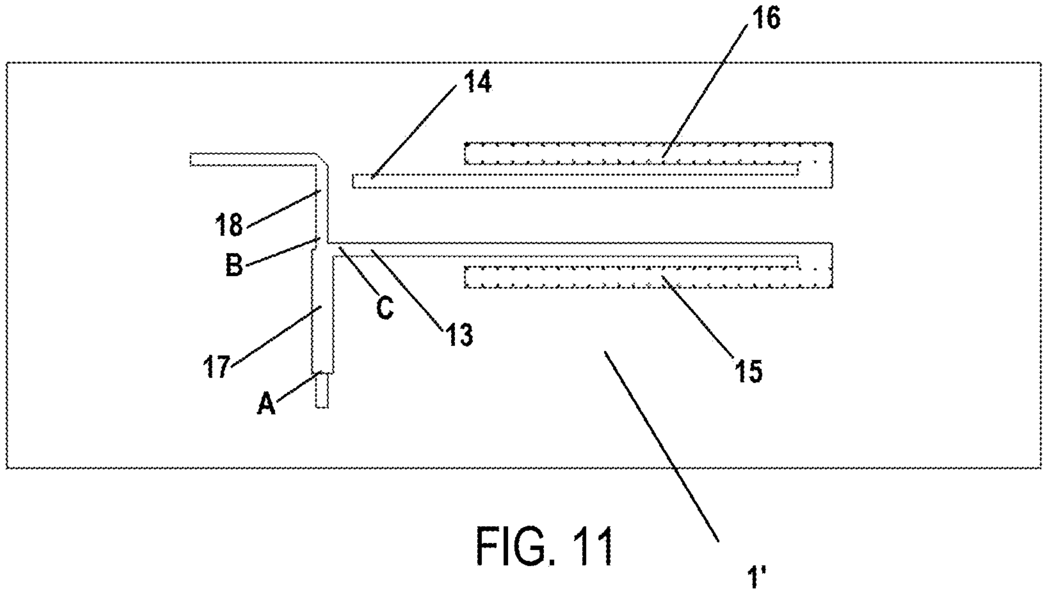
FIG. 11 is a top view of a fixed plate of the phase shifting device according to the second embodiment.
Figure 12:
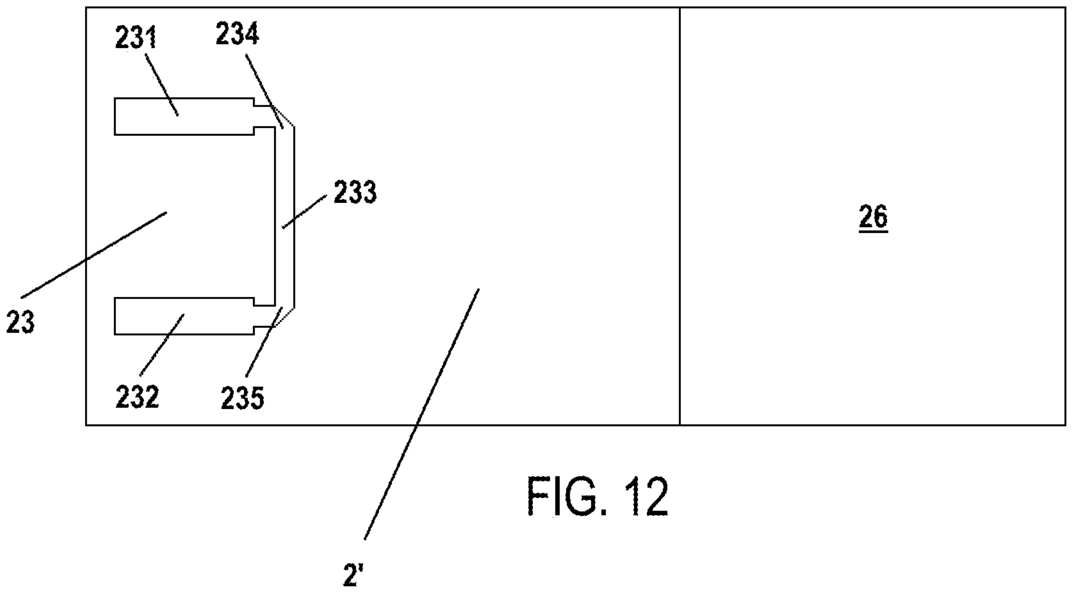
FIG. 12 is a bottom view of a sliding plate of the phase shifting device according to the second embodiment.
Figure 13:
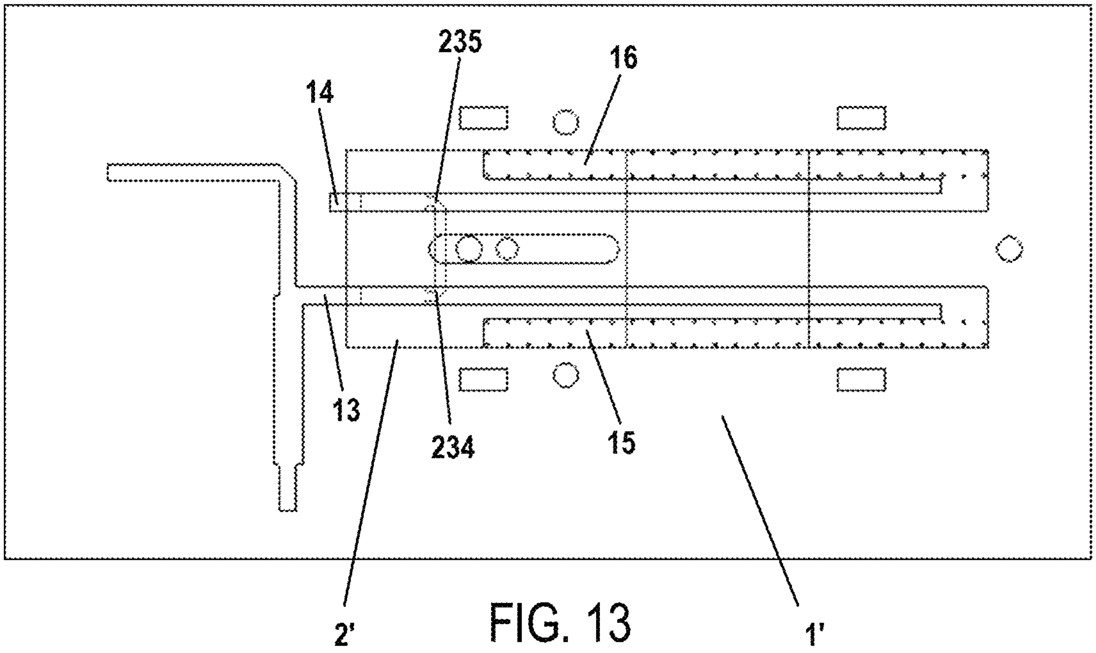
FIG. 13 is a diagram illustrating an assembly of the fixed plate and the sliding plate of the phase shifting device according to the second embodiment in switching-on state.
Figure 14:
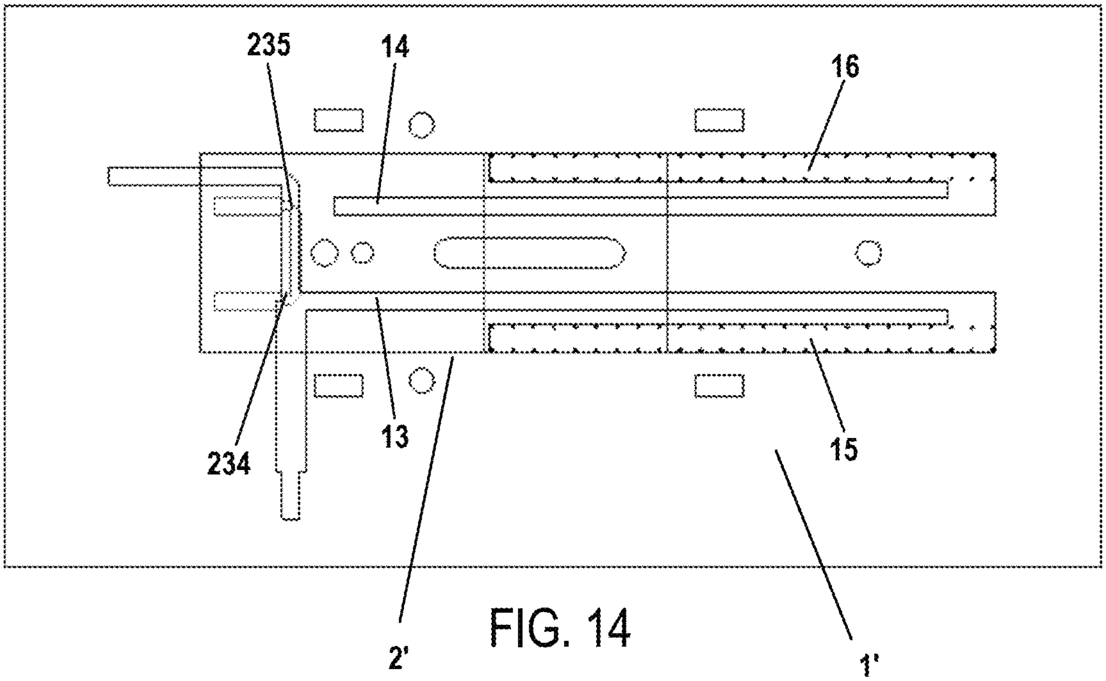
FIG. 14 is a diagram illustrating an assembly of the fixed plate and the sliding plate of the phase shifting device according to the second embodiment in switching-off state.

Now, the fixed plate 1' and the sliding plate 2' will be described in detail with reference to FIGS. 11-14. FIG. 11 illustrates a top view of the fixed plate 1'. FIG. 12 illustrates a bottom view of the sliding plate 2'. Note that for the purpose of clarity, the guiding groove 10' and the holes 11', 12' formed in the fixed plate 1' are omitted in FIG. 11 and the holes 21', 22' formed in the sliding plate 2' are omitted in FIG. 12. FIG. 13 illustrates an assembly of the fixed plate 1' and the sliding plate 2' in switching-on state. FIG. 14 illustrates an assembly of the fixed plate 1' and the sliding plate 2' in switching-off state.

As shown in FIG. 11, a power divider 17 made of a T-shaped microstrip line and two parallel microstrip lines 13, 14 are provided on a top surface ("first surface") of the fixed plate 1. The power divider 17 has an input inlet A for an input signal, a first output outlet B connected with an impedance member 18 made of a microstrip line having a system impedance (e.g. 50 ohms), and a second output outlet C connected with the microstrip line 13. Further two grounds 15, 16 are provided on the first plate 1' beside the two parallel microstrip lines 13, 14. In the illustrated embodiment, the two grounds 15, 16 are located at the outer side of the two parallel microstrip lines 13, 14. In another embodiment, the two grounds 15, 16 may be arranged between the two parallel microstrip lines 13, 14. In a further embodiment, the first plate 1' may be provided with a single ground. Although not shown in FIG. 11, the guiding groove 10 is located between the two parallel microstrip lines 13, 14 as shown in FIG. 9.

As shown in FIG. 12, a U-shaped microstrip line ("first part") 23 is provided on the left end ("one side") of a bottom surface ("second surface") of the sliding plate 2, and a conductive body ("second part") 26 is provided on the right end ("the other side") of the bottom surface of the sliding plate 2'. The U-shaped microstrip line 23 has two legs 231, 232 and a connecting bar 233. The U-shaped microstrip line 23 and the conductive body 26 form an adjusting member which together with the two parallel microstrip lines 13, 14 can constitute a phase shifter. When the sliding plate 2' slides relative to the fixed plate 1', depending on the position of the sliding plate 2' relative to the fixed plate 1', the phase shifter can operate normally as shown in FIG. 13 (which may be called switching-on state) to adjust the phase of the branch corresponding to the output outlet C, or be switched off as shown in FIG. 14 (which may be called switching-off state) so that the energy of the input signal is no longer transmitted to the branch corresponding to the output outlet C.

As shown in FIG. 13, in the switching-on state, the adjusting member is electrically coupled to the two parallel microstrip lines 13, 14 of the fixed plate 1' when the fixed plate 1' and the sliding plate 2' are assembled together. The spacing between the two legs 231, 232 of the U-shaped microstrip line 23 is the same as the spacing between the two parallel microstrip lines 13, 14 of the fixed plate 1'. The two legs 231, 232 of the U-shaped microstrip line 23 overlap the two parallel microstrip lines 13, 14 of the fixed plate 1'. Accordingly, the U-shaped microstrip line 23 defines an intermediate signal transmission path which couples the two parallel microstrip lines 13, 14 of the fixed plate 1'. The intermediate signal transmission path is coupled to the two parallel microstrip lines 13, 14 of the fixed plate 1' at two points, i.e., a first coupling point 234 between a first leg 231 and the connecting bar 233, and a second coupling point 235 between a second leg 232 and the connecting bar 233. The location of the two coupling points 234, 235 is fixed with respect to the sliding plate 2', but the location of two corresponding coupling points on the two parallel microstrip lines 13, 14 of the fixed plate 1' varies as the sliding plate 2' slides relative to the fixed plate 1'.

The conductive body 26 is a sheet made of metal, such as copper. The conductive body 26 is not limited to be a metal sheet, and may be a metal bar. The conductive body 26 couples the two parallel microstrip lines 13, 14 of the fixed plate 1' to the grounds 15, 16. A distance between each of the two coupling points 234, 235 of the U-shaped microstrip line 23 and a left end of the conductive body 26 is a quarter-wavelength of the target frequency. The location of the left end of the conductive body 26 is fixed with respect to the sliding plate 2', but the location of corresponding two points ("second point") on the two parallel microstrip lines 13, 14 of the fixed plate 1', which corresponds to the left end of the conductive body 26 of the sliding plate 2', varies as the sliding plate 2' slides relative to the fixed plate 1'.

In the switching-on state, an infinitely small impedance is introduced at a point on each of the two parallel microstrip lines 13, 14 of the fixed plate 1 that corresponds to the left end of the conductive body 26 of the sliding plate 2'. Further, an infinite impedance is introduced at the two coupling points on the two parallel microstrip lines 13, 14 of the fixed plate 1' that correspond to the two coupling points 234, 235 of the U-shaped microstrip line 23. Accordingly, when the phase shifter operates normally, the energy of the input signal flows from one microstrip line 13 on the fixed plate 1', through the U-shaped microstrip line 23 on the sliding plate 2', and then flows out from the other microstrip line 14. When the sliding plate 2' slides relative to the fixed plate 1', the length of the total signal transmission path through which the energy flows changes so that the phase changes accordingly. Compared with existing phase shifter solutions, the phase shifter according to this embodiment does not need to introduce an extra length of transmission line. Accordingly, the transmission of signal on the transmission line will not be affected during the whole travel of the sliding plate for phase shifting, the insertion loss is reduced, and the insertion phase is shorter.

The conductive body 26 of the sliding plate 2' and the grounds 15, 16 of the fixed plate 1' are arranged such that during a travel (or sliding) of the sliding plate 2', the conductive body 26 is (always) coupled to the grounds 15, 16 and the two parallel microstrip lines 13 14 of the fixed plate 1'.

Although not shown, a layer of insulating film is provided on the bottom surface of the sliding plate 2' and covers the U-shaped microstrip line 23 and the conductive body 26 of the sliding plate 2'. The insulating film prevents direct contact of the U-shaped microstrip line 23 and the conductive body 26 of the sliding plate 2' with the two parallel microstrip lines 13, 14 of the fixed plate 1', but still allows electrical coupling between the U-shaped microstrip line 23 or the conductive body 26 of the sliding plate 2' and the two parallel microstrip lines 13, 14 or the grounds 15, 16 of the fixed plate 1'. As a result, the third-order intermodulation distortion is suppressed.

As shown in FIG. 14, in the switching-off state, the U-shaped microstrip line 23 on the sliding plate 2' slides to coincide with the microstrip line 18 connected with the output outlet B of the T-shaped power divider 17. Since the distance between each of the two coupling points 234, 235 of the U-shaped microstrip line 23 and a left end of the conductive body 26 is a quarter-wavelength of the target frequency, the energy of the input signal is no longer transmitted to the branch corresponding to the output outlet C. In this case, part of the input signal travels through the microstrip line 18 and part of the input signal travels through the U-shaped microstrip line 23.

As an exemplary example, the combined structure formed by the U-shaped microstrip line 23 and the microstrip line 18 which are overlapped with each other may have an impedance and an electrical length which are approximately equal to the impedance and the electrical length of the microstrip line 17 respectively, so that the total electrical length of the combined structure and the microstrip line 17 is a half-wavelength of the target frequency and thus does not affect the impedance of the overall phase shifting device. As a result, the impedance of the transmission path can be adjusted and the energy loss in the transmission process can be reduced. Further, each of the microstrip lines 13, 14 may have an impedance equal to the system impedance (e.g. 50 ohms) so that the impedance of the branch corresponding to the output outlet C remains the system impedance when the phase shifter is in the switching-on state.

Figure 15:
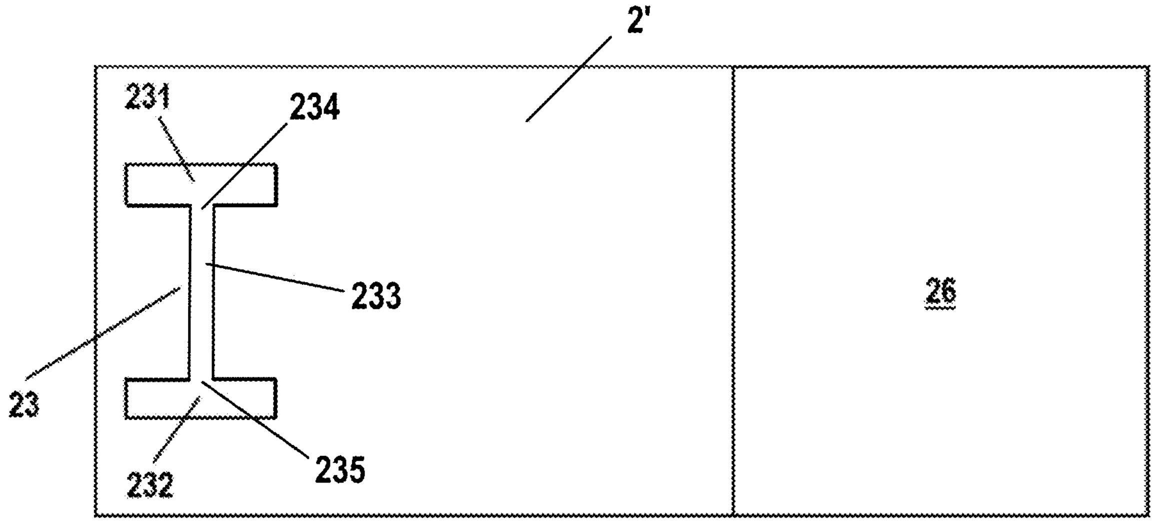
FIGS. 15-18 are bottom views of a sliding plate of the phase shifting device with H, M, V and W shape microstrip lines respectively.
Figure 16:
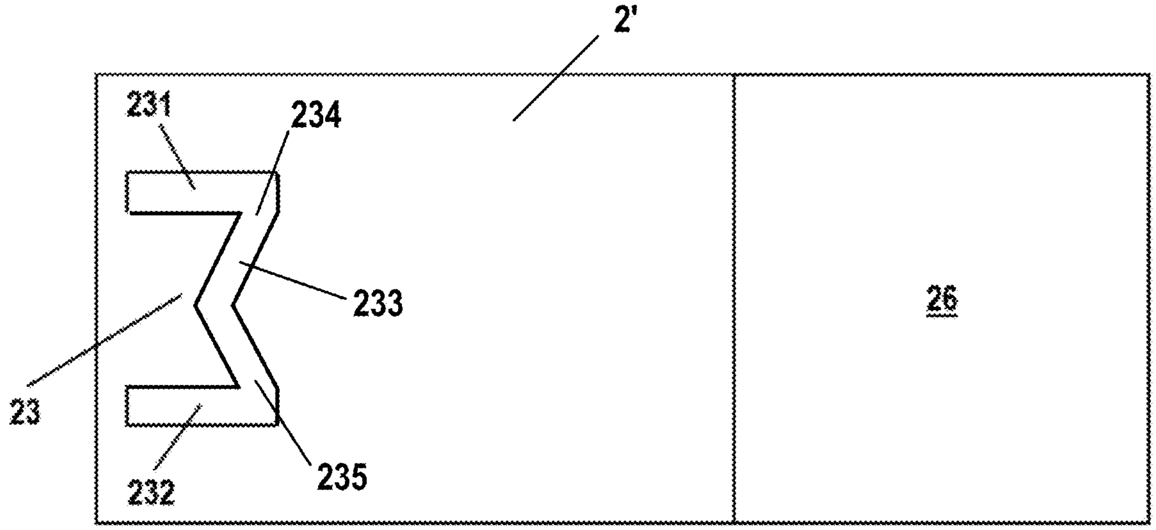
Figure 17:
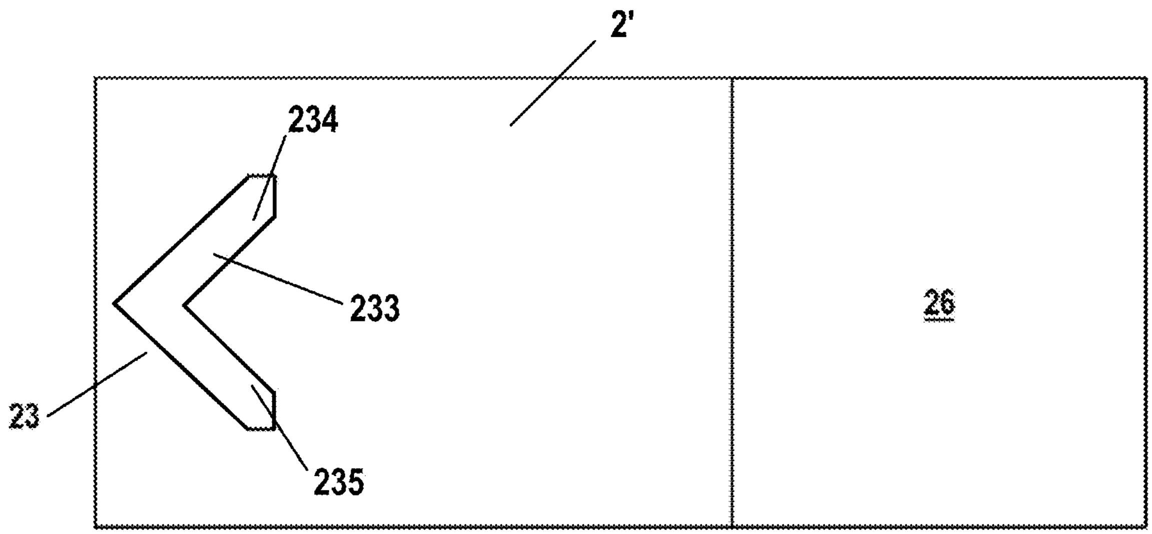
Figure 18:
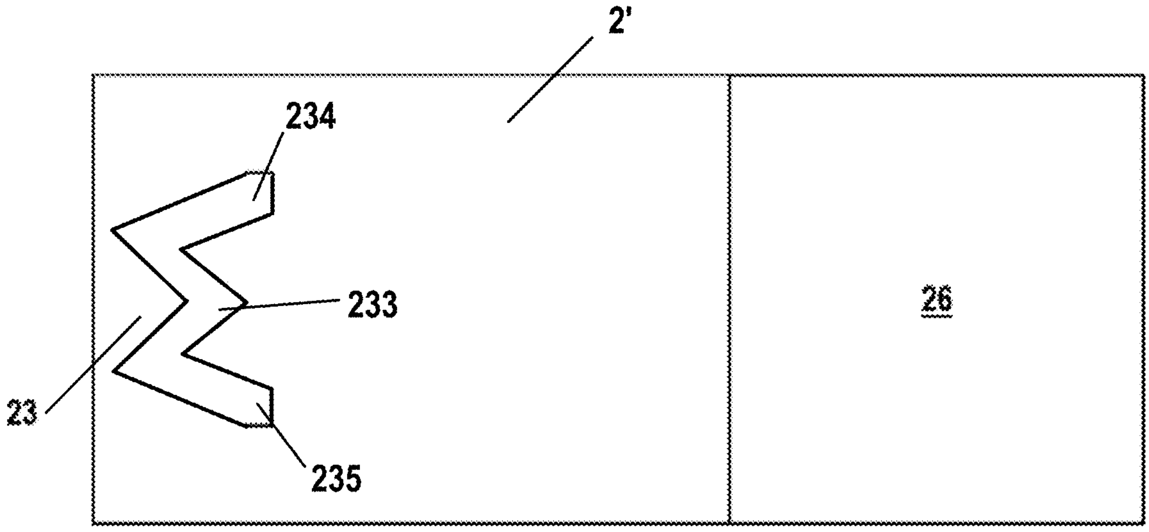

It should be noted that the present disclosure is not limited to the above example. As another example, any other suitable mechanism that enables the sliding plate 2' to slide relative to the fixed plate 1' may be used. As still another example, any other suitable power divider besides the T-shaped divider may be used. As still another example, a distance between each of the two coupling points 234, 235 of the U-shaped microstrip line 23 and the left end of the conductive body 26 of the sliding plate 2' is not limited to a quarter-wavelength of the target frequency, but may be any odd multiple of the quarter-wavelength. As still another example, the first part of the adjusting member may be a microstrip line having any other suitable shape such as H (i.e. FIG. 15), V (i.e. FIG. 17), W (i.e. FIG. 18) or M (i.e. FIG. 16). As still another example, the U-shaped microstrip line 23 may be opened toward the right side, i.e., toward the two parallel microstrip lines 24, 25 of the sliding plate 2', or may be replaced with a V-shaped microstrip line opened toward either the left side or the right side. Alternatively, a bar-shaped microstrip line may also be employed. In this regard, it would suffice as long as the microstrip line provides an intermediate signal transmission path having two points electrically coupled to the two parallel microstrip lines 13, 14 of the fixed plate 1', and a distance between each of the two points and the conductive body 26 is an odd multiple of a quarter-wavelength.

Based on the above description, one aspect of the present disclosure provides a phase shifting device. The phase shifting device may comprise a power divider and a phase shifter. The power divider may comprise an input inlet for an input signal, a first output outlet connected with an impedance member having a system impedance, and a second output outlet connected with the phase shifter. The phase shifter may comprise a first plate and a second plate slidable relative to the first plate. Two parallel microstrip lines may be provided on a first surface of the first plate. An adjusting member may be provided on a second surface of the second plate that faces to the first surface of the first plate. The adjusting member may be configured to adjust a length of a total signal transmission path that is from one of the two parallel microstrip lines to the other of the two parallel microstrip lines via an intermediate signal transmission path introduced by the adjusting member, or to prohibit the input signal from transmitting to the second output outlet, according to a position of the second plate relative to the first plate when the second plate slides relative to the first plate.

In another aspect, the present disclosure also provides an antenna unit comprising the above-mentioned phase shifting device. In still another aspect, the present disclosure also provides a base station comprising the above-mentioned phase shifting device. Since the above-mentioned phase shifting device is included, it is possible to reduce the energy loss when the phase shifter is switched off in the phase shifting device. The other parts of the antenna unit or the base station besides the phase shifting device may be well known to those skilled in the art and thus are omitted here.

Unless otherwise defined, all terms used herein (including technical and scientific terms) have the same meaning as commonly understood by those skilled in the art. It should be further understood that terms, such as those defined in commonly used dictionaries, should be interpreted as having a meaning that is consistent with their meaning in the context of the specification and the relevant art and should not be interpreted in an ideal or excessively formal sense unless clearly defined in the present disclosure.

The terminology used herein is for the purpose of describing particular embodiments only and is not intended to limit the present disclosure. As used herein, the singular forms “a”, “an” and “the” are intended to include the plural forms as well, unless the context clearly indicates otherwise. It will be further understood that the terms “comprises”, “comprising”, “has”, “having”, “includes” and/or “including”, when used herein, specify the presence of stated features, elements, and/or components, but do not preclude the presence or addition of one or more other features, elements, components and/or combinations thereof. As used herein, the statement that two or more parts are “coupled”, “connected” or “cascaded” together shall mean that the parts are joined together either directly or joined through one or more intermediate parts.

It should be understood that, although the terms “first”, “second” and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term “and/or” includes any and all combinations of one or more of the associated listed terms.

References in the present disclosure to “one embodiment”, “an embodiment” and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It is to be understood that the orientation or position relationships indicated by the terms such as “top”, “bottom”, “left”, “right”, etc. are the orientation or position relationships based on the drawings, which are only used to facilitate the description of the present disclosure or simplify the description, and are not intended to indicate or suggest that the members, components or apparatuses should have the specific orientations, or should be manufactured and operated in the specific orientations. Therefore, the terms should not be construed as limiting the present disclosure.

As used herein, the term “examples” particularly when followed by a listing of terms is merely exemplary and illustrative, and should not be deemed to be exclusive. It should be noted that various aspects of the present disclosure may be implemented individually or in combination with one or more other aspects. Furthermore, the detailed description and specific embodiments are intended for purposes of illustration only and are not intended to limit the scope of the disclosure.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A phase shifting device comprising:

a power divider comprising an input inlet for an input signal, a first output outlet connected with an impedance member having a system impedance, and a second output outlet connected with a phase shifter; and the phase shifter comprising a first plate and a second plate slidable relative to the first plate, wherein two parallel microstrip lines are provided on a first surface of the first plate, and an adjusting member is provided on a second surface of the second plate that faces the first surface of the first plate;

wherein the adjusting member is configured to adjust a length of a total signal transmission path that is from one of the two parallel microstrip lines to the other of the two parallel microstrip lines via an intermediate signal transmission path introduced by the adjusting member, or to prohibit the input signal from transmitting to the second output outlet, according to a position of the second plate relative to the first plate when the second plate slides relative to the first plate;

wherein when the second plate slides relative to the first plate so that the adjusting member can adjust the length of the total signal transmission path, the adjusting member introduces an infinite impedance at two coupling points on the two parallel microstrip lines where the intermediate signal transmission path is coupled to the two parallel microstrip lines;

wherein the adjusting member introduces another infinite impedance at two first points on the second plate, and a distance between each of the two coupling points and a corresponding first point is an integral multiple of half-wavelength.

2. The phase shifting device according to claim 1, wherein the power divider is a T-shaped power divider.

3. The phase shifting device according to claim 1, wherein the power divider is provided on the first surface of the first plate, and the second output outlet is connected with one of the two parallel microstrip lines.

4. The phase shifting device according to claim 1, wherein the system impedance is 50 ohms.

5. The phase shifting device according to claim 1, wherein the adjusting member comprises a first part on one side of the second surface of the second plate and a separate second part on the other side of the second surface of the second plate, the first part defining the intermediate signal transmission path and having two points that correspond to the two coupling points on the two parallel microstrip lines of the first plate, the second part including two parallel microstrip lines each of which has a first end adjacent to the first part and an opposite second end having the first points.

6. The phase shifting device according to claim 5, wherein the first part is a microstrip line having a shape of U.

7. The phase shifting device according to claim 5, wherein when the second plate slides relative to the first plate so that the first part overlaps with the impedance member connected with the first output outlet, the adjusting member can prohibit the input signal from transmitting to the second output outlet.

8. The phase shifting device according to claim 5, wherein the two parallel microstrip lines of the second plate have the same spacing as that of the two parallel microstrip lines of the first plate.

9. The phase shifting device according to claim 5, wherein during the sliding of the second plate relative to the first plate, the first end is coupled to a corresponding one of the two parallel microstrip lines of the first plate, and the second end does not overlap with the two parallel microstrip lines of the first plate or at most overlaps with a corresponding one of the two parallel microstrip lines of the first plate only at a limit position of the sliding of the second plate.

10. The phase shifting device according to claim 5, wherein the first part is a microstrip line having a shape of V or W.

11. The phase shifting device according to claim 5, wherein the first part is a microstrip line having a shape of H or M.

12. The phase shifting device according to claim 1, wherein the adjusting member introduces an infinitely small impedance at a second point on each of the two parallel microstrip lines of the first plate, and a distance between each of the two coupling points and a corresponding second point is an odd multiple of a quarter-wavelength.

13. The phase shifting device according to claim 12, wherein the adjusting member comprises a first part on one side of the second surface of the second plate and a separate second part on the other side of the second surface of the second plate, the first part defining the intermediate signal transmission path and having two points that correspond to the two coupling points on the two parallel microstrip lines of the first plate, the second part including a conductive body which couples the two parallel microstrip lines of the first plate to a ground.

14. The phase shifting device according to claim 13, wherein the conductive body is a sheet or a bar made of metal.

15. The phase shifting device according to claim 14, wherein the metal is copper.

16. The phase shifting device according to claim 13, wherein during the sliding of the second plate relative to the first plate, the conductive body is coupled to the ground and the two parallel microstrip lines of the first plate.

17. The phase shifting device according to claim 13, wherein the ground is provided on the first plate beside the two parallel microstrip lines.

18. The phase shifting device according to claim 1, wherein a layer of insulating film is provided on the second surface of the second plate and covers the adjusting member.

19. An antenna unit comprising a phase shifting device that comprises:

a power divider comprising an input inlet for an input signal, a first output outlet connected with an impedance member having a system impedance, and a second output outlet connected with a phase shifter; and the phase shifter comprising a first plate and a second plate slidable relative to the first plate, wherein two parallel microstrip lines are provided on a first surface of the first plate, and an adjusting member is provided on a second surface of the second plate that faces the first surface of the first plate;

wherein the adjusting member is configured to adjust a length of a total signal transmission path that is from one of the two parallel microstrip lines to the other of the two parallel microstrip lines via an intermediate signal transmission path introduced by the adjusting member, or to prohibit the input signal from transmitting to the second output outlet, according to a position of the second plate relative to the first plate when the second plate slides relative to the first plate;

wherein when the second plate slides relative to the first plate so that the adjusting member can adjust the length of the total signal transmission path, the adjusting member introduces an infinite impedance at two coupling points on the two parallel microstrip lines where the intermediate signal transmission path is coupled to the two parallel microstrip lines;

wherein the adjusting member introduces another infinite impedance at two first points on the second plate, and a distance between each of the two coupling points and a corresponding first point is an integral multiple of half-wavelength.

20. A base station comprising a phase shifting device that comprises:

a power divider comprising an input inlet for an input signal, a first output outlet connected with an impedance member having a system impedance, and a second output outlet connected with a phase shifter; and the phase shifter comprising a first plate and a second plate slidable relative to the first plate, wherein two parallel microstrip lines are provided on a first surface of the first plate, and an adjusting member is provided on a second surface of the second plate that faces the first surface of the first plate;

wherein the adjusting member is configured to adjust a length of a total signal transmission path that is from one of the two parallel microstrip lines to the other of the two parallel microstrip lines via an intermediate signal transmission path introduced by the adjusting member, or to prohibit the input signal from transmitting to the second output outlet, according to a position of the second plate relative to the first plate when the second plate slides relative to the first plate;

wherein when the second plate slides relative to the first plate so that the adjusting member can adjust the length of the total signal transmission path, the adjusting member introduces an infinite impedance at two coupling points on the two parallel microstrip lines where the intermediate signal transmission path is coupled to the two parallel microstrip lines;

wherein the adjusting member introduces another infinite impedance at two first points on the second plate, and a distance between each of the two coupling points and a corresponding first point is an integral multiple of half-wavelength.

* * * * *